United States Patent [19]

Schneider et al.

[11] 4,298,783
[45] Nov. 3, 1981

[54] DEEP NARROW GROOVE TUNGSTEN INERT GAS SHIELDED WELDING PROCESS

[75] Inventors: Urban A. Schneider, St. Petersburg; Robert E. Monley; Robert L. Nelson, both of Tampa; Raymond H. Glatthorn, St. Petersburg, all of Fla.

[73] Assignee: Westinghouse Electric Corp., Pittsburgh, Pa.

[21] Appl. No.: 77,208

[22] Filed: Sep. 20, 1979

[51] Int. Cl.³ .............................................. B23K 9/16
[52] U.S. Cl. ................................. 219/75; 219/137.42
[58] Field of Search ....................... 219/74, 75, 137.42

[56] References Cited
U.S. PATENT DOCUMENTS 2,721,250  10/1955  Franklin .................................. 219/75
4,110,590   8/1978  Batey et al. ............................. 219/75

FOREIGN PATENT DOCUMENTS 137202  8/1979  German Democratic Rep. ... 219/75

Primary Examiner—Gene Z. Rubinson
Assistant Examiner—Keith E. George
Attorney, Agent, or Firm—Daniel C. Abeles

[57] ABSTRACT

A method of applying a gas shielded tungsten arc welding process in a deep, narrow groove joint wherein the shield gas is directed to the weld puddle through an elongated gas nozzle 14 which surrounds a substantial length of the welding electrode and is sized to extend into the groove. The improvement including incrementally increasing the width (20) of the nozzle to correspond to increases in the width of the groove at preselected increases in the width of the groove as the nozzle is withdrawn from the groove during successive weld passes. The preselected elevations and nozzle widths are chosen so that the desired gas shield area does not substantially exceed 1.25 times the nozzle width.

3 Claims, 1 Drawing Figure

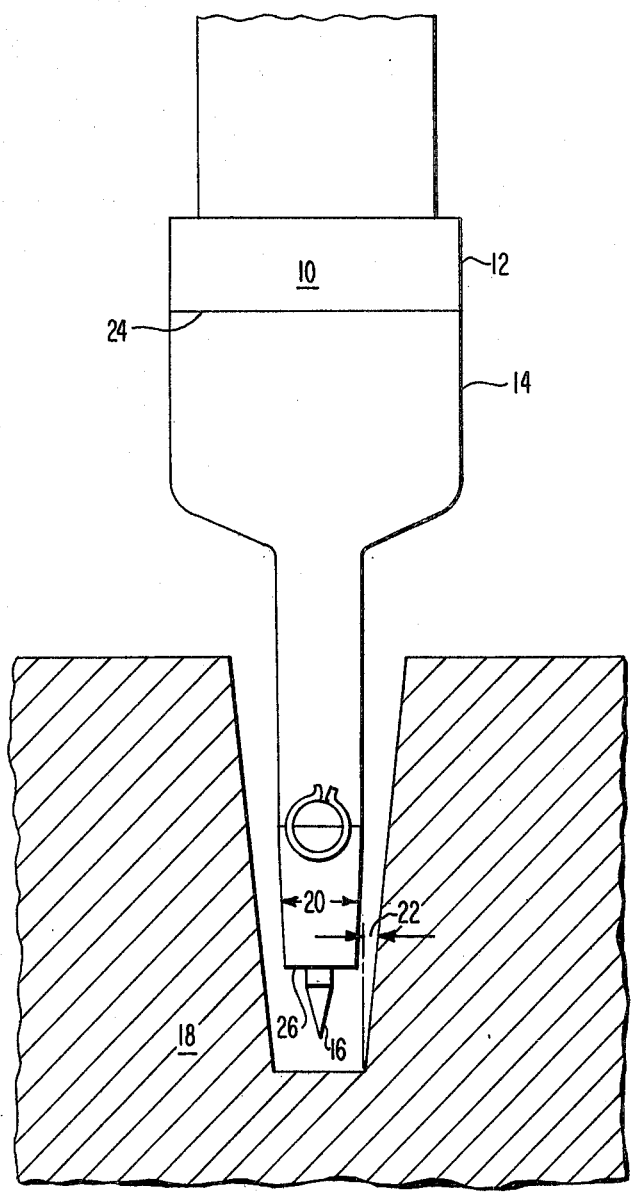

DEEP NARROW GROOVE TUNGSTEN INERT GAS SHIELDED WELDING PROCESS

CROSS-REFERENCE TO RELATED APPLICATIONS

This application is related to the subject matter of copending applications Ser. No. 077,209, filed Sept. 20, 1979 and Ser. No. 077,210, filed Sept. 20, 1979, both of which are assigned to the Westinghouse Electric Corporation.

BACKGROUND OF THE INVENTION

This invention pertains generally to gas tungsten arc welding processes and more particularly to such processes applied to deep, narrow grooves.

Gas tungsten arc welding processes achieve coalescence by heating the weld zone with an arc struck between a tungsten electrode and the workpiece. To prevent oxidation, the heated weld zone, the molten metal and the non-consummable electrode which carries the welding current, are shielded from the atmosphere by an inert gas stream which is directed from the electrode holder, commonly referred to as the welding torch.

Most commercial torch designs employ a collet within the main torch body for supporting and transferring weld current to the tungsten electrode. The electrode generally extends from the collet, axially through a surrounding gas nozzle and projects a short distance beyond the nozzle orifice. The shield gas is conveyed through the nozzle, along the electrode and out the orifice to the weld. Such an electrode is described in copending Application Ser. No. 077,210, cited above.

Shield gas coverage is an important factor in establishing a successful weld with the gas tungsten arc welding process. Adequate shield gas coverage is critically important when welding high strength, low alloys steels, such as A533, which is used in the manufacture of steam generators. This material is extremely difficult to weld utilizing the gas tungsten arc welding process due to the high stresses set up in the material from the quench and temper techniques employed in its manufacture. The highly stressed material readily oxidizes on contact with air. A superheated welding puddle applied with the tungsten inert gas arc welding process on such carbon and low alloy steels shows a higher propensity for oxidation than would be encountered in welding higher alloy steels. High porosity, excess surface oxidation, embrittlement and cracking can result from a lack of adequate shielding in such applications. Because of these characteristics of carbon and low alloy steels and the difficulty in obtaining adequate shield gas coverage, the welding industry has experienced only limited success in applying the gas tungsten arc welding process. A more conventional slag producing weld process is usually employed through the industry for joining materials of this type in semiautomated manufacturing applications. While the conventional slag bearing welding process is satisfactory for a number of semiautomated welding operations, it has not produced as high quality of weld as the tungsten inert gas arc welding process. In addition, the slag bearing process requires that the welding operation be performed in a flat, downhand (1G) position which is not always practical. For example, in a number of manufacturing arrangements and field service applications it is desirable to apply the weld in a horizontal (2G) position.

The ability to achieve adequate shield gas coverage while utilizing the gas tungsten arc welding process is further complicated when the process is applied in a deep, narrow groove. A deep, narrow groove weld prep is desirable because it reduces the amount of weld deposit required and the time it takes to complete the weld. Such grooves may extend an excess of 3 inches in depth, have a root radius in the order of 7/32 inch radius or smaller and as little as a 1°, to a 6° to 8°, included angle. The geometry and restrictiveness of the groove thus makes it difficult to maintain complete gas coverage of the weld puddle until coalescence is achieved. In addition, the use of a light shield gas, composed of, for example, 75% helium and 25% argon, which is desirably employed in such applications, adds to the difficulty in establishing good shield coverage. Furthermore, while welding in the 2G position, the hot metal adjacent the weld groove heats the surrounding air which rises and creates a draft in the weld groove (chimney effect) which draws away the gas coverage.

Accordingly, one object of this invention is to provide an improved gas shielded tungsten arc welding process that will provide adequate shield gas coverage in a deep narrow groove weld joint configuration. Another object of this invention is to provide such a process that will provide adequate shield gas coverage while welding in the 2G position. In addition, it is an object of this invention to provide such a welding process that will provide quality welds on high-strength, low alloy steels, such as A533.

SUMMARY OF THE INVENTION

Briefly, in accordance with this invention an improved method of applying a gas shielded tungsten arc welding process in a deep, narrow groove joint is provided. Normally in such processes the shield gas is directed to the weld puddle through an elongated gas nozzle which surrounds a substantial length of the welding electrode and is sized to extend into the groove. The improved method step of this invention incrementally increases the width of the nozzle to correspond to increases in the width of the joint, at preselected elevations in the depth of the groove, as the nozzle is withdrawn from the groove during successive welding passes. Desirably the preselected elevations at which the nozzle width is expanded are chosen so that the desired gas shield area does not exceed approximately 1.25 times the nozzle width. The increase in nozzle width is achieved by interchanging nozzles on the welding torch with progressively larger nozzles as the preselected elevations are reached during the successive welding passes.

BRIEF DESCRIPTION OF THE DRAWING

For a better understanding of the invention, reference may be had to the preferred embodiment, exemplary of the invention, shown in the accompanying drawing, in which the FIGURE illustrates a lateral cross-section of a deep, narrow groove weld joint with the welding torch gas nozzle inserted to weld depth.

DESCRIPTION OF THE PREFERRED EMBODIMENT

In accordance with this invention an improved gas tungsten arc welding process is provided for deep, narrow groove applications. Referring to the figure it can be appreciated that a deep, narrow groove joint 22 is illustrated having a 6° to 8° included angle. A tungsten inert gas welding torch 10 is shown having a main body portion 12 and a gas nozzle 14 fully inserted within the groove at weld depth with the welding electrode 16 protruding slightly beyond the nozzle orifice. A detailed description of such a welding torch can be found in Application Ser. No. 077,210. Coalescence of the weld is achieved by an arc struck between the welding electrode 16 and the workpiece 18. The quality of the weld established is dependent upon the adequacy of the shield gas coverage provided at the nozzle orifice 26. Improved shield gas coverage, and thus improved weld quality, is achieved in accordance with this invention by incrementally increasing the width of the nozzle at preselected elevations in the depth of the weld groove as the nozzle is withdrawn from the groove during successive weld passes, to correspond to increases in the width of the joint.

In accordance with this invention when the welding torch reaches designated elevations in the weld groove, in the course of successive weld passes, the torch 10 is withdrawn and the nozzle 14 is disconnected from the torch at the juncture 24 and replaced with a comparable nozzle having a wider orifice width 20 to correspond to the enlarged area of the groove at the weld depth. The mechanical coupling of the nozzle to the torch is more fully described in Application Ser. No. 077,210. Experimental results have shown that the preselected elevations are chosen so that the desired gas shield area around the weld puddle does not exceed approximately 1.25 times the nozzle width. For example, it has been shown that for a deep narrow groove extending in depth to 4 inches and having a 6°-8° included angle that as many as 5 nozzles, progressively larger in width, are required to achieve optimum weld quality.

Thus, in accordance with this invention, improvements in gas shield coverage achieved by progressively increasing the gas nozzle width, incrementally, upon successive weld passes, substantially increases the quality of the welds achieved in high strength, low alloy steels, such as A533.

We claim as our invention:

1. A method of applying a gas shielded tungsten arc welding process in a deep, narrow groove joint wherein the shield gas is directed to the weld puddle through an elongated gas nozzle which surrounds a substantial length of the welding electrode and is sized to extend into the groove, including the step of incrementally increasing the width of the nozzle to correspond to increases in the width of the groove at preselected increases in the width of the groove as the nozzle is withdrawn from the groove during successive weld passes.

2. The method of claim 1 wherein the preselected widths are chosen so that the desired gas shield area does not substantially exceed 1.25 times the nozzle width.

3. The method of claim 1 wherein the increase in nozzle width is achieved by interchanging the nozzle on the welding torch with progressively larger nozzles as the preselected elevations are reached during successive weld passes.

* * * * *